United States Patent Office 3,069,396
Patented Dec. 18, 1962

3,069,396
POLYMERS OF POLYFLUOROTHIOKETONE
William J. Middleton, Claymont, Del., assignor to E. I. du Pont de Nemours and Company, Wilmington, Del., a corporation of Delaware
No Drawing. Filed Feb. 9, 1959, Ser. No. 791,860
17 Claims. (Cl. 260—79)

This invention relates to, and has as its principal objects provision of, polymers of certain fluorinated organic compounds containing sulfur and the preparation of the same.

Fluorinated compounds of various types are known and many of them possess properties that make them valuable in particular applications. Although fluorine is very active, fluorinated hydrocarbons are generally inert. High molecular weight fluorinated compounds have found utility where thermal stability is required. In general, sulfur compounds are not considered to possess a very high degree of chemical and thermal stability.

In accordance with the above-mentioned and yet other objects which will be evident from the remainder of this specification, there are now produced novel polymers of polyfluorothioketones in which the carbons attached to the thiocarbonyl carbon are free from hydrogen. A preferred group of polymers are of the polyfluorothioketones which have the general formula

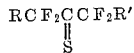

wherein R and R′ are halogen, hydrocarbon or halohydrocarbon of up to six carbons, particularly alkyl or haloalkyl. These polyfluorothioketones and their preparation are described in U.S. Pat. No. 2,970,173, issued January 31, 1961. The polymers of these polyfluorothioketones are generally linear polymers, including copolymers of the polyfluorothioketones with other copolymerizable monomers.

These new high molecular weight linear polymers are obtained by subjecting the monomeric polyfluorothioketone to a temperature of below about −80° C. generally in the presence of, as a catalyst, a compound providing or accepting a pair of electrons (i.e., a Lewis acid or base). The temperature employed is below that of solid carbon dioxide and generally is obtained by liquid air or similar coolants. The temperature is generally −80° C. to about −200° C. with −120° C. or below preferred.

When the temperature is above about −80° C., the monomeric polyfluorothioketone can be converted to the corresponding dithietane, i.e., the cyclic dimers

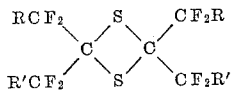

The conversion is facilitated by the presence of a Lewis base and takes place most readily at temperatures of −75° to 100° C. When the temperature is maintained at −50° to −80° C., most of the pure monomeric polyfluorothioketones are stable for considerable periods of time. At temperatures of above about 400° C., the dithietane is converted to monomer.

The exact temperature at which the monomer is converted to linear high polymer rather than to cyclic dimer depends upon the nature of the monomer and the catalyst. Below about −120° C. linear polymer is the major product whereas between −120 and −80° C. dimer may form along with the linear polymer.

The conversions to linear polymers are brought about under essentially liquid phase conditions, i.e., liquid to semi-solid conditions. Solvents for the monomers that are liquid below −80° C. and preferably below −120° C., e.g., dimethyl ether, ethane, propane, butane, and the like, are employed to dissolve the monomeric polyfluorothioketone and catalyst added. The solution can be frozen by rapid cooling. Upon warming to the liquid state, polymerization takes place. The polymerization is readily followed by observation of the fact that the blue-colored monomer is converted to colorless solid polymer which precipitates from any solvent present. Although solvents are generally preferred, linear polymers form in the absence of added solvents under the above conditions.

Separation of reaction products from each other and from unreacted materials according to the process of the invention can be readily accomplished by obvious methods. Thus dimer, linear polymer, unreacted monomer and diluent, where used, can easily be separated by fractional distillation taking advantage of the differences in boiling points. Other methods of separation are, however, available, as will be readily understood.

This invention is illustrated in further detail by the following examples wherein I–IV illustrate dithietane preparation, and V–XI show the preparation of linear polymers.

EXAMPLE I

Tetrakis(Trifluoromethyl)-1,3-Dithietane (Also Named Perfluorotetramethyl-1,3-Dithietane)

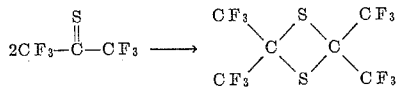

Perfluoropropanethione, 0.7 g., was sealed in a glass tube and allowed to warm from −80° C. to room temperature. The color faded from deep blue to green and then to yellow over a period of five hours. The resulting liquid was frozen in an ice bath and sublimed at 1 mm. pressure into a trap cooled by solid carbon dioxide/acetone. There was obtained 0.25 g. of perfluorotetramethyl-1,3-dithietane as a white solid, M.P. 22–23° C.

Analysis.—Calcd. for $C_6F_{12}S_2$: C, 19.79%; F, 62.61%; S, 17.61%. Found: C, 19.64%; F, 62.36%; S, 17.52%.

Perfluorotetramethyl-1,3-dithietane is useful for conversion by pyrolysis to its monomer and, in the liquid state, as an inert transformer fluid.

EXAMPLE II

Mercury, 40.2 g., was added dropwise to a flask containing 150 g. of sulfur heated to reflux. A total of 108 g. of bis(heptafluoro-2-propyl)mercury was then added dropwise over a period of two hours. A slow stream of nitrogen was also passed through the reaction mixture during the addition. The effluent gases were condensed in a trap cooled by solid carbon dioxide/acetone. At the end of the reaction the trap contained a mixture of a deep blue liquid and a white solid. The more volatile blue component was distilled at reduced pressure from the trap into another trap cooled by liquid nitrogen. The deep blue-black distillate (hexafluorothioacetone) was allowed to warm slowly to room temperature under autogenous pressure. After 16 hours the blue color had faded to yellow. Distillation of this material gave 19.6 g. of a light yellow oil, B.P. 99–111° C. Examination of the n-m-r spectrum of this material indicated that it was principally tetrakistrifluoromethyl-1,3-dithietane with small amounts of impurity present.

The impure dimer was shaken with 50 ml. of 10% sodium hydroxide and 25 ml. of 30% hydrogen peroxide until the initial exothermic reaction had subsided. The organic layer was separated, dried over silica gel, and distilled. There was obtained 13.8 g. of tetrakis(trifluoromethyl)-1,3-dithietane as a colorless oil, B.P. 110° C., M.P. 22–23° C.; $n_D^{26}$, 1.3360. Identification was made by analysis of its n-m-r spectrum.

EXAMPLE III

Dimer of Hexafluorothioacetone

Hexafluorothioacetone, 2.4 ml., was placed in a flask and cooled to −80° C. A solution of three drops of dimethylformamide in 5 ml. of ether was added to the hexafluorothioacetone. The blue color faded instantly, and in a few minutes, a white crystalline precipitate formed. The solution was allowed to warm to room temperature and then distilled. There was obtained 2.1 g. of tetrakis(trifluoromethyl)-1,3-dithietane as a colorless liquid, B.P. 109–111° C. The product was identified by comparison of its n-m-r spectrum with that of an authentic sample.

EXAMPLE IV

Tetrakis(Trifluoromethyl)-1,3-Dithietane

A solution of 10 g. (0.038 mole) of triphenyl phosphine in 15 ml. of acetone was added dropwise to 10.05 g. (0.025 mole) of bis(heptafluoro-2-propyl)disulfide cooled in ice. After one hour, the reaction mixture was distilled to dryness under vacuum, and the distillate was drowned in water. The organic layer was separated, dried over silica gel, and distilled. There was obtained 4.98 g. of tetrakis(trifluoromethyl)-1,3-dithietane as a colorless liquid, B.P. 110–111° C. The product was identified by its n-m-r spectrum and comparison with other samples.

The dithietane was similarly prepared by reaction of a mixture of bis(heptafluoro-2-propyl)disulfide, trisulfide, and tetrasulfide with triphenyl phosphine.

These sulfides were obtained as follows: A 400-ml. bomb containing 156 g. (0.29 mole) of bis(heptafluoro-2-propyl)mercury and 32 g. (1 mole) of sulfur was heated at 220° C. for 12 hours. The bomb was cooled and vented, the residue was filtered, and the filtrate distilled. There was obtained 30.5 g. of bis(heptafluoro-2-propyl)disulfide, B.P. 110–124° C., 39.5 g. of bis(heptafluoro-2-propyl)trisulfide, B.P. 150–155° C., and 12.7 g. of bis(heptafluoro-2-propyl)tetrasulfide, B.P. 180–186° C.

*Analysis.*—Calcd. for $C_6F_{14}S_2$: C, 17.9%; S, 15.9%. Found: C, 17.9%; S, 15.3%.

Calcd. for $C_6F_{14}S_3$: C, 16.6%; S, 22.1%. Found: C, 17.0%; S, 22.0%.

Calcd. for $C_6C_{14}S_4$: C, 15.4%; S, 27.4%. Found: C, 15.3%; S, 26.8%.

EXAMPLE V

A glass trap containing 1 ml. of $BF_3$-etherate was immersed in liquid nitrogen and evacuated. Perfluoropropanethione, 5 ml., was distilled into the trap. The trap was removed from the liquid nitrogen bath, and the frozen contents were allowed to melt slowly. Acetone, 15 ml., was added to the trap when the blue color of the perfluoropropanethione had disappeared. The solid material in the trap was collected on a filter, washed with acetone, and dried. There was obtained 1.7 g. of polyperfluoropropanethione as a white, rubbery polymer, insoluble in most common solvents. The polymer was pressed at 50° C. and 10,000 lb./sq. in. into an elastomeric film.

*Analysis.*—Calcd. for $(C_3F_6S)_n$: S, 17.61%. Found: S, 17.28%.

EXAMPLE VI

A solution of two drops of dimethylformamide in 5 ml. of ether contained in a glass trap was frozen in a liquid nitrogen bath. The trap was evacuated, and 2 ml. of perfluoropropanethione was distilled into the trap on top of the frozen ether. The entire frozen contents of the trap were warmed until about one half melted. The contents were frozen again by immersing the trap in the liquid nitrogen bath and then remelted several times until the blue color of the thioketone was discharged. The trap was allowed to warm to room temperature, and 25 ml. of acetone was added. The polymer was collected on a filter, washed with acetone, and dried. There was obtained 0.7 g. of polyperfluoropropanethione as a white, rubbery solid.

*Analysis.*—Calcd. for $(C_3F_6S)_n$: C, 19.79%; F, 62.61%; S, 17.61%. Found: C, 20.27%; F, 62.94%; S, 17.95%.

EXAMPLE VII

A solution of one drop of dimethylformamide in 5 ml. of pentane contained in a glass trap was frozen solid in liquid nitrogen. The trap was evacuated, and 1 ml. of perfluoropropanethione was distilled into the trap. The trap and its contents were allowed to warm slowly to room temperature. As soon as the contents of the trap began to melt, they were mixed by vigorous shaking. After the trap had warmed to room temperature, 15 ml. of acetone was added and the white, rubbery polymer was collected. There was obtained 0.37 g. of polyperfluoropropanethione.

EXAMPLE VIII

The procedure described in Example VII was repeated, except that two drops of ethyl alcohol were used in place of the dimethylformamide. There was obtained 0.35 g. of white, rubbery polymer.

EXAMPLE IX

The procedure described in Example VII was repeated, except that two drops of benzenethiol were used as the catalyst. There was obtained 0.19 g. of yellow, rubbery polymer.

EXAMPLE X

The procedure described in Example VII was repeated, except that 1 ml. of dry ethyl ether was used as the catalyst. There was obtained 0.37 g. of white, rubbery polymer.

EXAMPLE XI

The procedure described in Example VII was repeated, except that propane was used as solvent in place of the pentane. There was obtained 0.19 g. of rubbery polymer.

The new products of this invention comprise polymers of monomeric acyclic thioketones in which each of the carbons attached to the thiocarbonyl group is free from hydrogen. The carbons directly attached to the thiocarbonyl group together are attached to at least two and generally at least four fluorines. The remaining substituents are halogen, hydrocarbon, or halohydrocarbon. Preferred are compounds of the formula

wherein R groups are halogen, hydrocarbon, or halohydrocarbon, of up to six carbons. In addition to the compounds and polymers specifically disclosed in the preceding examples, by one or more of the methods previously described the following monomers are likewise available for conversion to polymers: perfluorohexane-2-thione; perfluoroheptane-2-thione; perfluorooctane-2-thione; perfluorononane-2-thione; and 1,1,1,3,3-pentafluorobutane-2-thione.

A further compound useful for polymer formation in this invention is trifluorothiacetophenone.

Mixtures of different polyfluorothioketones are also converted to dithietanes and to linear high copolymers. Likewise, copolymerization with other polymerizable monomers, such as thiocarbonyl fluoride ($F_2C=S$), fluoroaldehydes, e.g., trifluoroacetaldehyde, and thioacyl fluorides, e.g., trifluorothioacetyl fluoride, can be effected.

Although the conversion of monomeric polyfluorothioketones to dimer and linear polymer i.e., compositions having the recurring unit

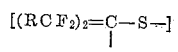

takes place without added catalyst, Lewis acids or bases generally expedite the polymerization. Particularly useful are dimethylformamide and hydrocarbon ethers. The amount of initiator used is subject to wide variation; thus it can vary from 0% (i.e., no added catalyst) to several hundred per cent (i.e., when the solvent such as ether acts as catalyst), based on the monomer weight. Generally up to 25% is preferred.

The linear polymers of polyfluorothioketones according to this invention possess at least ten recurring monomeric groups and a molecular weight of at least about 2000. They are generally elastomeric and exhibit considerable inertness to attack by corrosive chemical reagents. The polymers can be extruded under pressure and at elevated temperature (e.g., above 50° C.) and at pressures of 10,000 lb./sq. in. or more to provide shaped objects. They can be extruded on wires to provide flexible insulation. Self-supporting films obtained from the polymers are useful as gasket material. Filaments are likewise obtained from the polymer by extrusion and are useful in the preparation of elastic fabric resistant to solvent attack.

Although the linear polymer itself is not stable at high temperatures, treatment with reagents such as phosphorus pentachloride increases the heat stability. Similar improvement is obtained by contacting the polymer with olefinic compounds, e.g., cyclopentene, at room temperature for a few hours prior to shaping.

Since obvious modifications in the invention will be evident to those skilled in the chemical arts, I propose to be bound solely by the appended claims.

The embodiments of the invention in which an exclusive property or privilege is claimed are defined as follows:

1. A linear hompolymer having at least about 10 recurring monomeric groups of a polyfluorothioketone of the formula $$RCF_2\overset{S}{\underset{\|}{C}}CF_2R'$$

wherein R and R' are selected from the group consisting of fluorine, chlorine, lower alkyl and polyfluoro-lower alkyl.

2. A linear homopolyemer of perfluoropropanethione having at least about 10 recurring monomeric groups.

3. A linear copolymer of (1) a polyfluorothioketone of the formula $$RCF_2\overset{S}{\underset{\|}{C}}CF_2R'$$

wherein R and R' are selected from the group consisting of fluorine, chlorine, lower alkyl and polyfluoro-lower alkyl and (2) another polymerizable monomer selected from the group consisting of polyfluorothioketones of the formula above, polyfluoro-lower alkyl aldehydes and polyfluoro-lower alkyl thioacyl fluorides.

4. A linear copolymer of perfluoropropanethione and another polymerizable monomer selected from the group consisting of polyfluorothioketones of the formula above, thiocarbonyl fluoride, polyfluoro-lower alkyl aldehydes and polyfluoro-lower alkyl thioacyl fluorides.

5. A shaped object formed from a solid polymer of claim 1.

6. A shaped object formed from the linear homopolymer of claim 2.

7. A film formed from the linear hompolymer of claim 2.

8. A filament formed from the linear hompolymer of claim 2.

9. A shaped object formed from a solid polymer of claim 3.

10. A shaped object formed from a solid polymer of claim 4.

11. The polymerization process which comprises subjecting at least one polyfluorothioketone of the formula $$RCF_2\overset{S}{\underset{\|}{C}}CF_2R'$$

wherein R and R' are selected from the group consisting of fluorine, chlorine, lower alkyl and polyfluoro-lower alkyl, in the liquid phase to a temperature between about 100 and −200° C.

12. The polymerization process of claim 11 accomplished in the presence of a catalyst selected from the group consisting of boron trifluoride-ethereate, dimethylformamide, liquid saturated hydrocarbon ethers, lower alkanols and benzenethiol.

13. The polymerization process which comprises subjecting perfluoropropanethione to a temperature of between about 100 and −200° C.

14. The polymerization process of claim 13 wherein the temperature is between about 0 and −80° C.

15. The polymerization process of claim 13 wherein the temperature is between about −80 and −200° C.

16. The polymerization process of claim 13 accomplished in the presence of a catalyst selected from the group consisting of boron trifluoride-ethereate, dimethylformamide, liquid saturated hydrocarbon ethers, lower alkanols and benzenethiol.

17. The polymerization process of claim 13 wherein the perfluoropropanethione contains a second polymerizable monomer selected from the group consisting of polyfluoro-lower alkyl aldehydes and polyfluoro-lower alkyl thioacyl fluorides.

References Cited in the file of this patent

"Journal of the Chemical Society," London, 1955, pages 3871–80 (page 3876 relied on).

UNITED STATES PATENT OFFICE
CERTIFICATE OF CORRECTION

Patent No. 3,069,396                                            December 18, 1962

William J. Middleton

It is hereby certified that error appears in the above numbered patent requiring correction and that the said Letters Patent should read as corrected below.

Column 5, line 33, for "hompolymer" read -- homopolymer --; line 42, for "homopolyemer" read -- homopolymer --; column 6, lines 10 and 12, for "hompolymer", each occurrence, read -- homopolymer --.

Signed and sealed this 10th day of September 1963.

(SEAL)
Attest:

ERNEST W. SWIDER                                    DAVID L. LADD
Attesting Officer                                        Commissioner of Patents